United States Patent

Beauchamp et al.

[11] Patent Number: 6,144,778
[45] Date of Patent: Nov. 7, 2000

[54] PIXEL WEIGHTED TRANSITION SCANNING TO AMELIORATE SWATH SCANNER BANDING

[75] Inventors: Robert W. Beauchamp, Carlsbad; Curtis J. Behrend, San Diego, both of Calif.

[73] Assignee: Hewlett-Packard Company, Palo Alto, Calif.

[21] Appl. No.: 08/926,773

[22] Filed: Sep. 8, 1997

[51] Int. Cl.[7] .............................. G06K 9/00; G06K 7/00; G06K 9/20; G06K 9/36
[52] U.S. Cl. ........................ 382/318; 382/312; 382/284
[58] Field of Search .................................. 382/318, 312, 382/313, 284, 264; 348/264; 358/447, 452, 494, 496, 497, 453, 463

[56] References Cited

U.S. PATENT DOCUMENTS

| | | | |
|---|---|---|---|
| 4,692,812 | 9/1987 | Hirahara et al. | 358/443 |
| 4,967,203 | 10/1990 | Doan et al. | 346/1.1 |
| 4,999,646 | 3/1991 | Trask | 346/11 |
| 5,140,432 | 8/1992 | Chan | 358/298 |
| 5,512,923 | 4/1996 | Bauman | 347/15 |
| 5,644,683 | 7/1997 | Ross et al. | 395/108 |

*Primary Examiner*—Jose L. Couso
*Assistant Examiner*—Dmitry A. Novik

[57] ABSTRACT

A computerized methodology for reducing swath scanner swath boundary discontinuities is provided by using a predetermined overlap of pixel rows during each sequential scan. Pixel data from a first scan of the overlapped pixel rows is compared to the pixel data from a second scan of the overlapped pixel rows, identical pixels of the overlapped pixel rows ideally having the same representative scan data. Errors are compensated by weighting representative scan data for each pixel row, linearly decreasing the weighting in proportion to the proximity to the swath boundary. In one embodiment, the weighting factor is an increase or decrease in the first scan data relative to the percent change in white level intensity captured in the second scan of the overlapped pixel rows. In another embodiment, the weighting factor is a linear shifting of the proportion of the pixel data from the first scan and the pixel data from the second scan of the overlapped pixel rows used as the scanned image data such that the proportion of the first scan decreases as the proportion of the second scan increases, thereby smoothing differentials in data representative of individual pixel rows at swath boundaries. In another embodiment, scanner signal-to-noise ratio is improved by using a weighting factor in accordance with the Central Limit Theorem.

18 Claims, 8 Drawing Sheets

(3 of 8 Drawing Sheet(s) Filed in Color)

Where N:#0/scans

PIXEL WEIGHTED TRANSITION SCANNING TO AMELIORATE SWATH SCANNER BANDING

BACKGROUND OF THE INVENTION

1. Field of the Invention

The present invention relates generally to devices and methods for forming scanned electronic images, more specifically, to swath scanners and a programmed method for reconciling captured data to ameliorate banding at swath boundaries.

2. Description of Related Art

Scanners for creating an electronic image of an original print or document are well known in the state of the art. Typically, a captured image provided by scanning an original with a drum, flatbed, two-dimensional array, or hand-held scanner is in the form of picture element ("pixel") data, comprising a data matrix, or array, that is stored in a memory in a digital format. In other words, with a scanner, an original image is captured and converted into a digital light-intensity map for computer processing. In this two-dimensional map of pixels, each pixel holds an intensity measurement corresponding to the optical information, in reflectance or transmittance values, of the scanned object at the physical location represented by the pixel. The scanner captures each pixel with as many as 36-bits to describe the gray levels or color gradations of the original. In the state of the art for both scanning and printing the captured data—such as with an ink-jet printer—a pixel can be as small as 1/600-inch across.

Data acquisition and processing to produce a faithful reproduction of the original presents many problems to scanner and printer system engineers. In conversion from a typical color scanner, producing 3-bytes (24-bits) of light intensity level data for each pixel (1 of $2^8$=256 possible levels), to ink-jet printing where only 3-bits are necessary to describe the presence or absence of a color dot of cyan, magenta, and yellow primary color ink or black ink, the total of eight printer dot colors to more than 16-million ($2^{24}$) possible scanner-pixel colors requires substantial data manipulation to print an acceptable rendering.

In swath scanning where the original is scanned swath-by-swath (x-axis) orthogonally to the direction of the paper movement (y-axis), problems are added to the faithful reproduction aspect in that swath interface regions, or boundaries, are subject to error. In other words, while a page-size, two-dimensional scanner has the luxury "seeing" whole rows of the image pixels at once and therefore having gradual, relatively invisible, changes in illumination levels for the data acquisition task, the moving scanner has the added problem of aligning and putting together, or algorithmically "stitching," sets of swaths. This can result in a clear and unacceptable errors in a scanned rendition. For example, in FIG. 1A—a copy of a Kodak™ test photograph pattern— distinct swath interface regions, or "swath boundary discontinuities," generally referred to in the art as "banding," can be seen with the naked eye (e.g., the vertical bands are particularly noticeable in the caption line which in the original test print has a continuous hue), presenting a good, yet flawed, copy of the original.

Photometer signal measurements—measuring the incident light and converting the measured value to an analog voltage used by an analog-to-digital converter to produce each pixel data point—are susceptible to even small changes in distance between the photometer and the illuminated source since intensity falls proportional to the distance squared. For example, near paper pinch rollers, relatively large deformations of the transported media occurs, making the distance between the document being scanned and the sensors different at the edges of the document than at the middle where it is generally held flat against a platen. Any calibration error incurred from the start of the scan of a swath, pixel location 1 hereinafter, to the end of the swath, pixel location M, will result in noticeable visual discontinuities in the final rendering.

Mechanical fixes to this problem generally relate to trying to hold the paper profile constant between the calibration pass (for example, the setting of the sensitivity limits of a white level (highest intensity, normalized to a "1") and black level (lowest intensity, normalized to a "0")) and the actual scan passes. Alternatively, devices try to provide an illumination which is insensitive to changes in paper height. While generally inexpensive, and therefore commercially desirable fixes, the eye's sensitivity to the problem is so keen that removal of all visible banding due to this phenomena by mechanical means only have not been totally successful. Furthermore, the problem can be exacerbated in a curved paper path device which has a dual function, such as an ink-jet printer with an interchangeable scanner head, where a curved platen is preferable for printing processes but undesirable for scanning processes. Additionally, paper profiles will vary depending on the thickness of the media, making a calibration for one medium unsuited for use with the other.

For color image scanning, another solution is provided by the use of multi-pass scanning where three exposures (red, green, blue) are captured in each pass and the data recombined using color comparison correction algorithms. While one-pass/one-exposure scanners offer added flexibility and speed but less critical image reproduction, multiple-pass/multiple-exposure scanners offer better image quality but at the expense of throughput. Examples of various multi-pass image rendering techniques are found in U.S. Patent Nos. 5,644,683, 5,512,923 5,140,432 4,999,646, 4,967,203 (each assigned to the common assignee of the present invention).

Another problem caused by swath boundary discontinuities is that it makes it difficult to apply image processing to the scan data, particularly for sharpening an image.

Thus, there is a continuing need for improvement in the data acquisition and processing techniques for swath scanners in order to improve scan quality. There is a need for a system less sensitive to paper height changes during scanning.

The term "programmed" as used herein for description or claims is intended to include any of various electronic methods of performing the recited functions or logical steps, such as with the use of software, firmware, state machines, application specific integrated circuits ("ASICs"), and the like as would be familiar to a person skilled in the art of computer and computer peripherals technology.

SUMMARY OF THE INVENTION

In its basic aspects, the present invention provides a method of forming pixel weighted transition regions in multi-pass scanning of an original to ameliorate swath scanner banding at swath boundaries. The method includes the steps of:

capturing pixel data of a first swath;

capturing pixel data of a second swath such that the second swath includes an overlap swath region with the first swath by a predetermined number of pixels;

comparing pixel data of the overlap swath region captured during the step of capturing pixel data of a first swath with pixel data of the overlap swath region captured during the step of capturing pixel data of a second swath;

determining a weighting factor based upon differences between identical pixel data points obtained during the step of comparing;

applying the weighting factor to pixel data of the overlap swath region captured during the step of capturing pixel data of a first swath; and substituting weighted pixel data from the step of applying for overlap swath region pixel data of the first swath.

In another basic aspect, the present invention is a computerized method of improving visual quality of boundary regions of swaths of pixel data captured by a swath scanning apparatus, the method comprising the steps of:

scanning a first swath of an original, the swath including a plurality of pixel rows, and capturing optical information indicative of individual pixels of the original during the scanning;

storing data representative of each pixel of all pixel rows of the first swath in a first buffer;

storing data representative of each pixel of a first predetermined number of pixel rows adjacent the first swath top boundary in a second buffer;

storing data representative of each pixel of a second predetermined number of pixel rows adjacent the first swath bottom boundary in a third buffer, where the second predetermined number of pixel rows equals the plurality of pixel rows minus the first predetermined number of pixel rows;

scanning a second swath of the original subjacent the first swath, the second swath having the same number of pixel rows as the first swath and overlapping the pixel rows of the first swath bottom boundary with pixel rows adjacent the second swath top boundary by the second predetermined number of pixel rows;

storing data representative of each pixel of all pixel rows of the second swath in a first buffer;

comparing data representative of each pixel of the second predetermined number of pixel rows adjacent the first swath bottom boundary in the third buffer to the data representative of each same pixel of the overlapping pixel rows of the second swath top boundary, and determining any difference in data representative of each same pixel;

applying a weighting factor to each pixel of the overlapping pixel rows of the first swath bottom boundary based upon a combination of any difference from the step of determining and upon the distance of a pixel to be weighted from the first swath bottom boundary wherein the weighting factor is proportional to the distance; and repeating each step for each successive subjacent swath of the original.

In another basic aspect of the present invention there is provided a memory having a program for reducing swath scanner swath boundary discontinuities, said program comprising the steps of:

determining a number of scans, N, to scan an entire original;

determining a pixel advance overlap region for swaths of said scans;

scanning swaths of an original image;

capturing data for i=1:P, j=1:M, where i=a pixel number of a range of number of pixel rows in a swath, P, and j=a of pixel number of a range of pixels in a row having an array row length of M pixels;

storing captured scan data for I=1:P, j=1:M in an swath buffer;

for I=1:P/2 and j=1:M, storing captured scan data in an image buffer;

for the pixel advance overlap regions, storing captured scan data from said swath buffer in a save buffer;

reforming said image buffer data for said overlap regions by weighting captured data in accordance with a predetermined formulae such that a pixel weighted transition zone replaces captured data for the pixel advance overlap regions for each swath having a boundary with a preceding swath.

In one embodiment, a weighting factor is applied to the pixel data captured during the step of capturing pixel data of a first swath as a percentage change of each data point directly proportional to the difference in white level intensity between a pixel of the overlap region times the distance from the swath boundary divided by the swath width.

In another embodiment, the weighted data for a swath boundary is determined by comparing a pixel data point in the overlap region captured during the step of capturing pixel data of a first swath with an identical pixel data point captured during the step of capturing pixel data of a second swath; determining distance between the pixel data point of the overlap region and the swath boundary; and setting the weighting factor as a first proportion of the pixel data point captured during the step of capturing pixel data of a first swath and a second proportion of the pixel data point captured during the step of capturing pixel data of a second swath wherein the first proportion and second proportion are linearly decreasing and increasing, respectively, as the distance of the identical pixel from the swath boundary decreases.

The weighting factor itself can also be a use of other data smoothing algorithms, such as exponential, polynomial, paper profile characteristic curves, and the like, known, profiling equations, applied to scanner captured data as would be common in the state of the art.

It is an advantage of the present invention that it provides an algorithmic solution to swath scanning banding errors.

It is an advantage of the present invention that it provides a user selectable mode of operation to control throughput time.

It is an advantage of the present invention that it reduces the need for complete multi-pass swath scans, virtually eliminating the accompanying reduction in throughput.

It is another advantage of the present invention that it provides an essentially no-cost commercial solution that can be programmed into a scanner apparatus.

Other objects, features and advantages of the present invention will become apparent upon consideration of the following explanation and the accompanying drawings, in which like reference designations represent like features throughout the drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 1A–1C are exemplary prints for comparison of swath scanner banding amelioration in accordance with the present invention in which:

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventor(s) for practicing the invention. Alternative embodiments are also briefly described as applicable.

In its basic aspects, the present invention is an algorithmic process used as a program for enhancing quality of a scanned image data by overlapping the swaths by a predetermined, limited number of pixels and using the hereinafter described data enhancement techniques for providing an enhanced copy of a scanned original.

In one aspect of the invention, the intensity for white level calibration is compared at both ends of the swath. This information is used to adjust the intensity of one of the swaths so that the swath boundary of adjacent swaths match, thereby virtually eliminating boundary discontinuities.

In another aspect of the invention, a variable partial overlap, multi-pass scan is performed and data smoothing applied to meld the overlapped swath regions into a substantially continuous transition zone.

Figure 2:
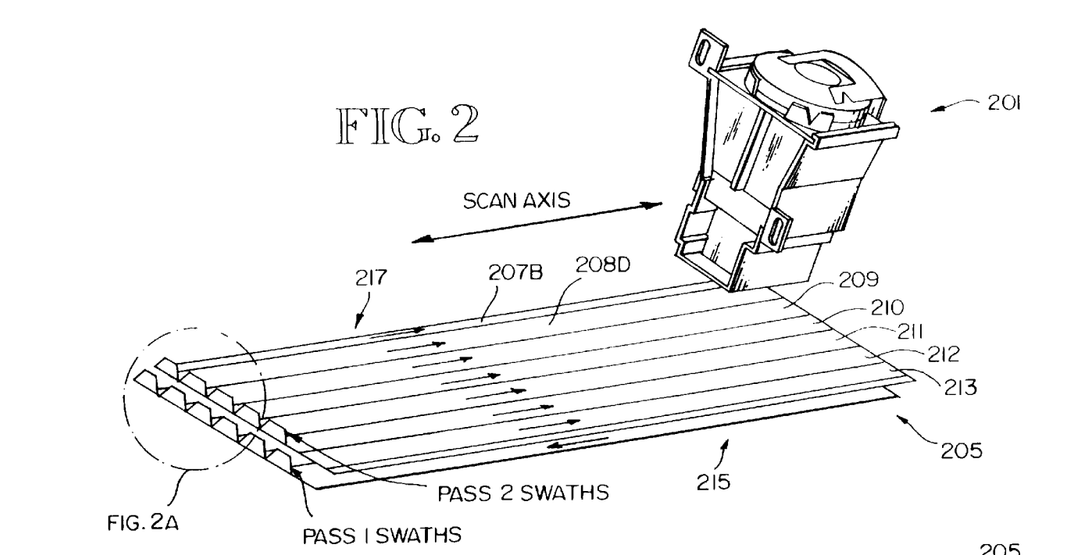
FIG. 2, and a detail of FIG. 2 in FIG. 2A, are a schematic representation of the methodology in accordance with the present invention.

As a specific exemplary embodiment, assume a scanner has a swath height of 100-pixels over approximately ⅓-inch, providing a resolution of 300 dots-per-inch ("dpi" hereinafter). Assume further that bidirectional swath scanning is performed as shown in FIG. 2. A cartridge scanning device 201 as would be known in the art (for example, see assignee's co-pending patent application Ser. No. 08/601,421 (Dobbs)) translates along the Scan Axis (see arrow) across an original, image bearing media 205 in swaths 207–213 sequentially and bidirectionally. For convenience of description and understanding, a first scan pass is represented as fictional media pass level, or plane, 215 and labeled "Pass 1" and a second pass is represented as fictional media pass level 217 and labeled "Pass 2."

Figure 2A:
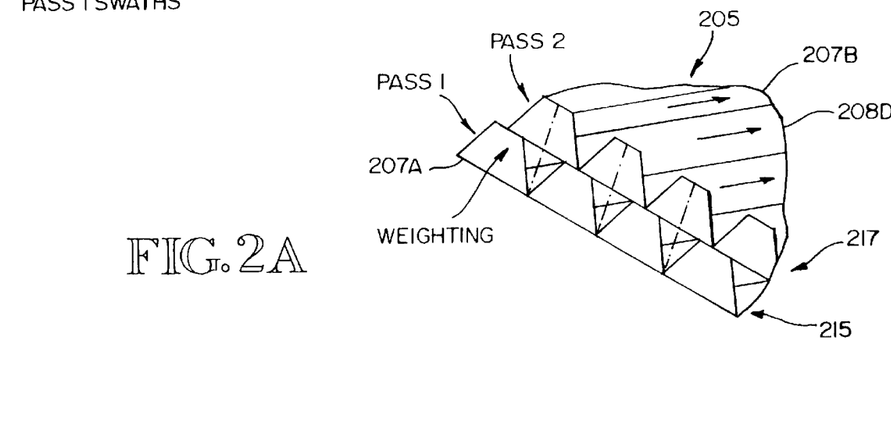

In a multi-pass mode, rather than a full swath, 100-pixel, ⅓", paper advance after Pass 1, a 96-pixel swath advance is used, creating a running, sequential pass, 4-pixel overlap region at each swath boundary (other implementations may choose an advance of 97/3, 95/5, 94/6, et seq., or the like for other size scanner head arrays). In other words, an overlap between Pass 1 and Pass 2 is confined to a predetermined number of a few pixel rows of each swath at the swath boundary. For example, where SWATH A/PASS 1(FIG. 2A, 207A) is Then, a paper advance of 96 pixels is employed such that overlap occurs:

Data compensation is then applied. That is, data is compensated pixel-by-pixel by:

comparing the intensity of SWATH B pixel 1 with SWATH A pixel 97, comparing the intensity of SWATH B pixel 2 with SWATH A pixel 98, comparing the intensity of SWATH B pixel 3 with SWATH A pixel 99, and comparing the intensity of SWATH B pixel 4 with SWATH A pixel 100.

In the original, these are identical pixels, so using the difference information, if any, the data from SWATH A is adjusted so that it matches the data from SWATH B. For example, if on average the lines from SWATH B are 10% higher in intensity based on the white/black calibration, then SWATH A is adjusted linearly where:

compensated SWATH A pixel 96=110% of SWATH A pixel 96;

. . .

compensated SWATH A pixel 48=105% of SWATH A pixel 48;

. . .

compensated SWATH A pixel 01=100% of SWATH A pixel 1.

After the pixel-by-pixel comparison across the swath width, to continue the process, the paper is advanced by the next 96 pixels, SWATH C (FIG. 2A, at 208C) is scanned, and SWATH B is compensated using the overlap information between SWATH B and SWATH C. The paper is advanced by the next 96 pixels, SWATH D (FIG. 2, at 208D) is scanned, SWATH C is compensated using the overlap information between SWATH C and D, and so on through the entire original, in FIG. 2, swath 213.

Thus, in this embodiment, the weighting factor is applied to pixel data captured during the step of capturing pixel data of a first swath as a percentage change of each data point directly proportional to the difference in white level intensity level, e.g., with reference to a calibrated white level intensity, between a current pixel of the overlap region times the distance from the swath boundary divided by the swath width.

Figure 1A:
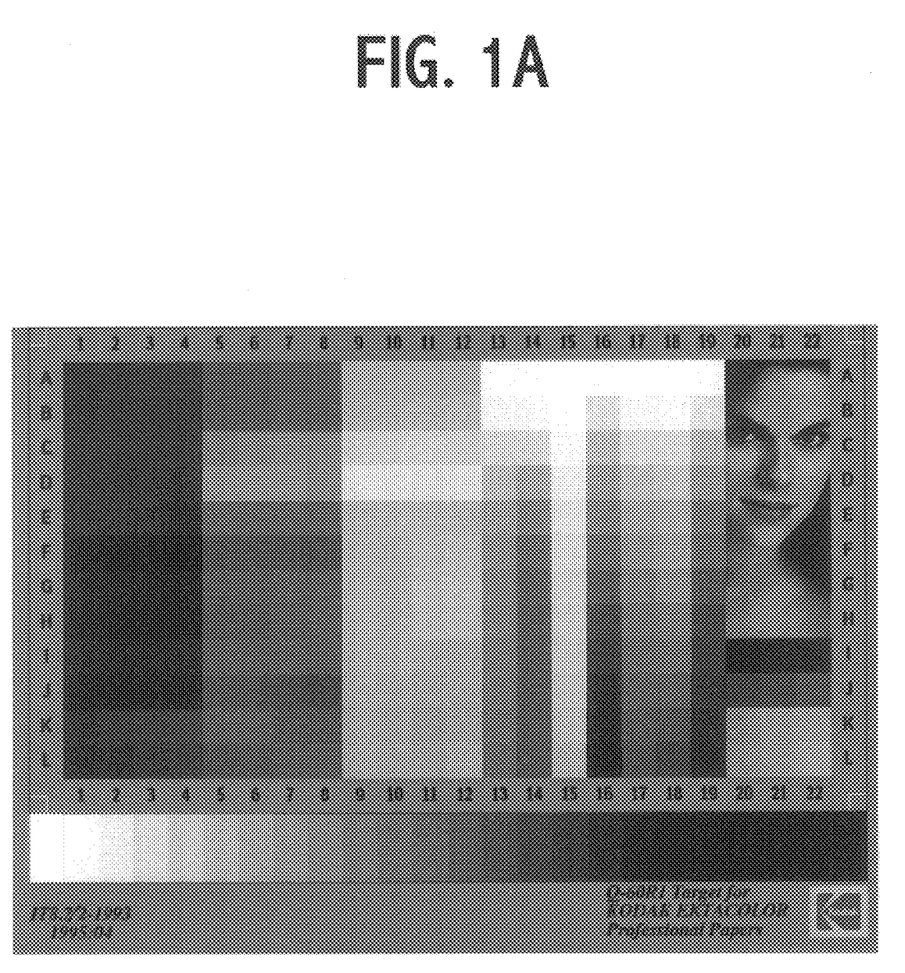
FIG. 1A is a print without performance of the present invention enhancement methodology.
Figure 1B:
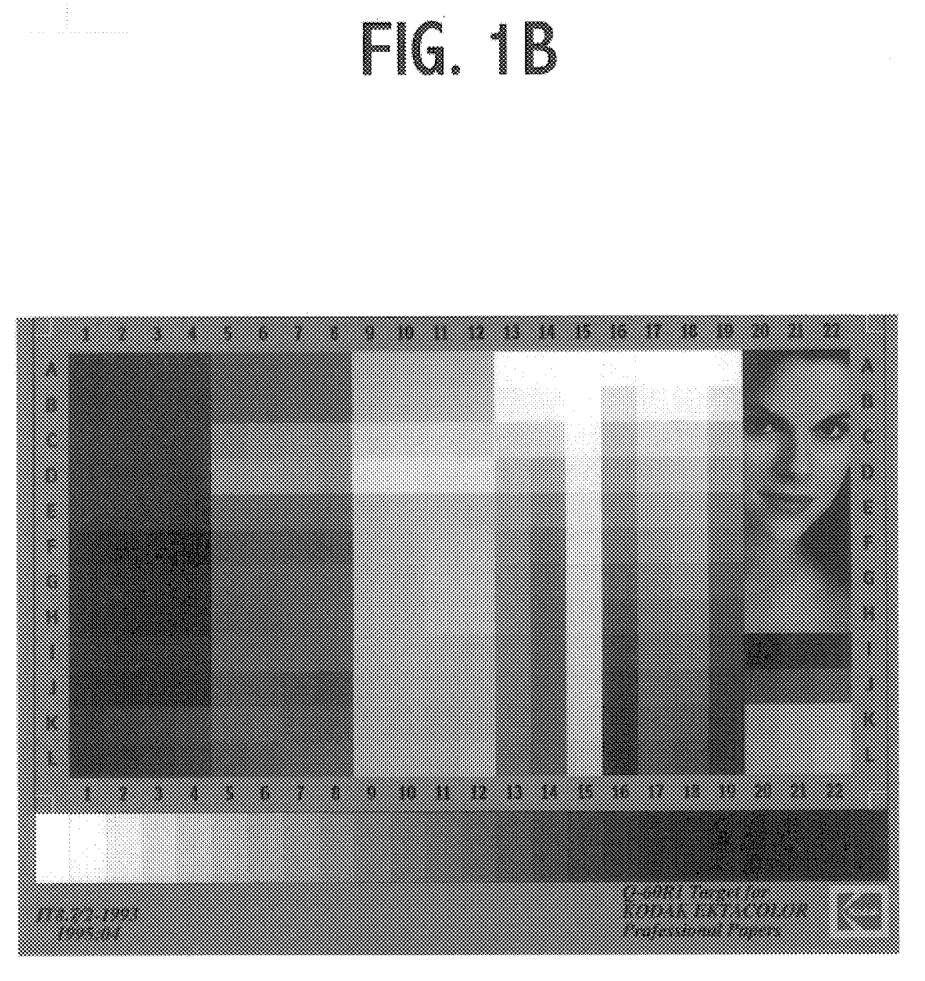
FIG. 1B is a print with compensation in accordance with the present invention enhancement methodology in which relatively small swath overlap is used.

With such a small overlap, no noticeable throughput change is incurred and print enhancement is achieved as can be seen in comparing FIG. 1A with FIG. 1B, the same test print with the described 4-pixel overlap comparison and compensation technique employed. The quality is improved and the swath boundaries are more continuous, although some banding is still evident.

Another programmable swath overlap comparison and compensation technique in a preferred embodiment for high quality scanning is implemented where a one-half swath ±½-pixel overlap is used. The methodology of swath overlap and data smoothing can be exemplified for 600 dpi resolution as follows:

| 1st Pass pixel numbers: | 2nd Pass | pass direction and number: |
|---|---|---|
|  | 49 |  |
| 100 |  | > 1 1 1 1 1 1 1 1 1 1 1 1 1 1 1 1 1 1 1>_ 1/600" |
|  | 50 | < 2 2 2 2 2 2 2 2 2 2 2 2 2 2 2 2 2 2 2<_ |
| 1 |  | > 1 1 1 1 1 1 1 1 1 1 1 1 1 1 1 1 1 1 1> |
|  | 51 | < 2 2 2 2 2 2 2 2 2 2 2 2 2 2 2 2 2 2 2< |
| 2 |  | > 1 1 1 1 1 1 1 1 1 1 1 1 1 1 1 1 1 1 1> |
|  | 50 | < 2 2 2 2 2 2 2 2 2 2 2 2 2 2 2 2 2 2 2< |
| 3 |  | > 1 1 1 1 1 1 1 1 1 1 1 1 1 1 1 1 1 1 1> |
|  | 49 | < 2 2 2 2 2 2 2 2 2 2 2 2 2 2 2 2 2 2 2< |
| 4 |  | > 1 1 1 1 1 1 1 1 1 1 1 1 1 1 1 1 1 1 1> |
| . | 48 | < 2 2 2 2 2 2 2 2 2 2 2 2 2 2 2 2 2 2 2< |
| . | . | . |
| . | . | . |
| . | . | . |
| 100 |  | > 1 1 1 1 1 1 1 1 1 1 1 1 1 1 1 1 1 1 1> |
|  | 49 | < 2 2 2 2 2 2 2 2 2 2 2 2 2 2 2 2 2 2 2<. |

Figure 3:
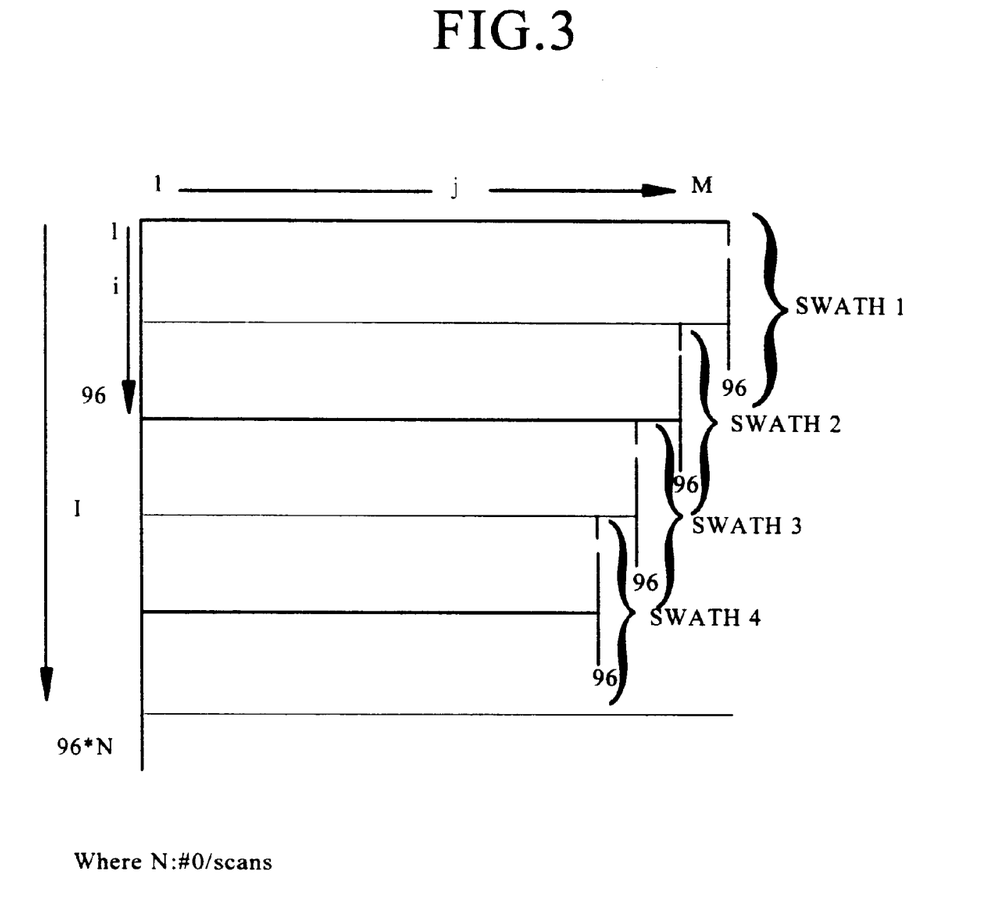
FIG. 3 is a graphical depiction of the methodology as shown in FIG. 2–2A.

This is also depicted in graphic form in FIG. 3.

In an actual implementation preferred embodiment, a scanner can be constructed to have 102 pixels evenly spaced. Paper advance is then 51 pixels.

Again, a linear data compensation is applied as follows:

pixel 1=100% of SWATH A pixel 52+0% of SWATH B pixel 1, pixel 2=98% of SWATH A pixel 53+2% of SWATH B pixel 2,

. . .

pixel 26=50% of SWATH A pixel 77+50% of SWATH B pixel 26,

. . .

pixel 50=2% of SWATH A pixel 101+98% of SWATH B pixel 50, pixel 51=98% of SWATH A pixel 52+100% of SWATH B pixel 1.

In other words, the step of determining a weighting factor comprises comparing a pixel data point in the overlap region captured during the step of capturing pixel data of a first swath with an identical pixel data point captured during the step of capturing pixel data of a second swath; determining distance between the pixel data point of the overlap region and the swath boundary; and setting the weighting factor as a first proportion of the pixel data point captured during the step of capturing pixel data of a first swath and a second proportion of the pixel data point captured during the step of capturing pixel data of a second swath wherein the first proportion and second proportion are linearly decreasing and increasing, respectively, as the distance of the the identical pixel from the swath boundary decreases.

Similarly to the few pixel overlap embodiment described above, the original document is advanced by 51 pixels and SWATH C is scanned, and the next swath of compensated data derived using the SWATH B pixels 52 to 102 with SWATH C 25 pixels 1 to 51, and so on.

Figure 1C:
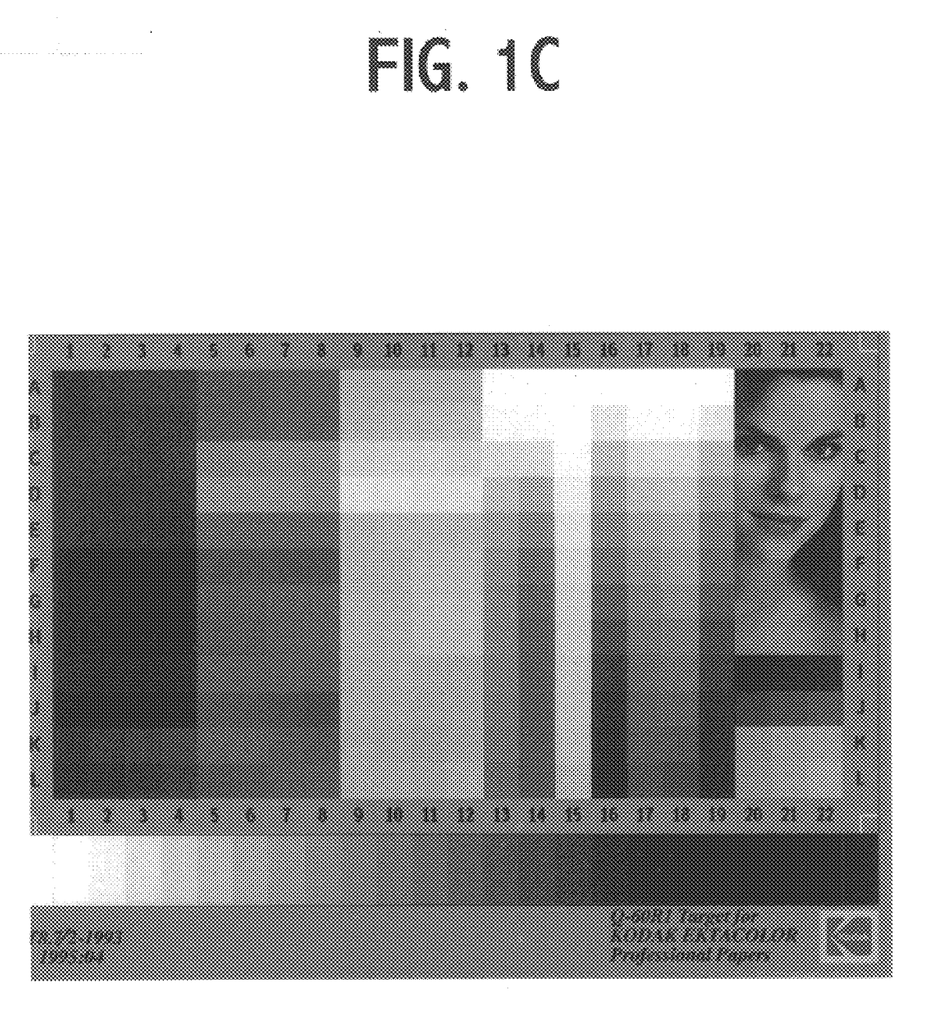
FIG. 1C is a print with compensation in accordance with the present invention enhancement methodology in which a half-swath overlap is used.

FIG. 1C in comparison to FIG. 1A shows that visible banding in the test print is virtually eliminated. Now, however, there is an approximate 50% reduction in throughput since each pass except the first and last overlaps the prior pass by half the swath height. Note that throughput and data smoothing can thus be balanced for each individual device or even user preference, ranging from a half-swath overlap down to a few pixel rows overlap. In a commercial application, a hardware or software mode switch can be provided to the user such that a selectable draft mode of operation might employ a high-throughput mode using a several pixel overlap algorithm and an enhanced quality mode using up to a half-swath overlap algorithm, all in accordance with the present invention.

While a linear compensation is applied to captured swath data in the exemplary embodiments described, this is in no way intended as a limitation on the scope of the invention. Other data smoothing algorithms, such as exponential, polynomial, paper profile characteristic curves, and the like profiling equations as would be known in the art, can be applied to the multi-pass captured data. Appropriate data point compensation as a linear process is justified in the present invention by once again considering a scan head in terms of white level intensity and the black level intensity readings.

Figure 5:
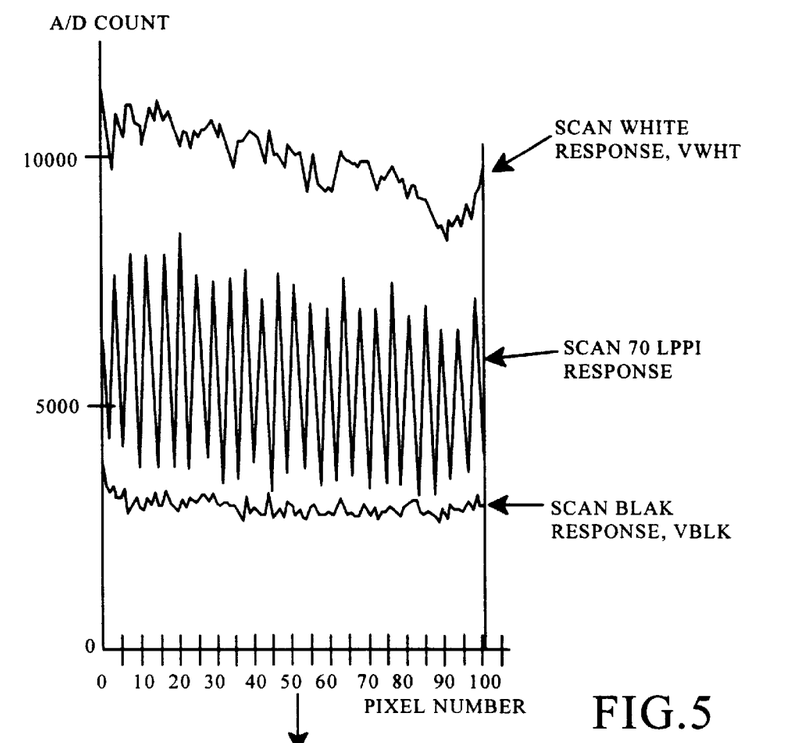
FIG. 5 is a graph depicting scanner response curves.
Figure 6:
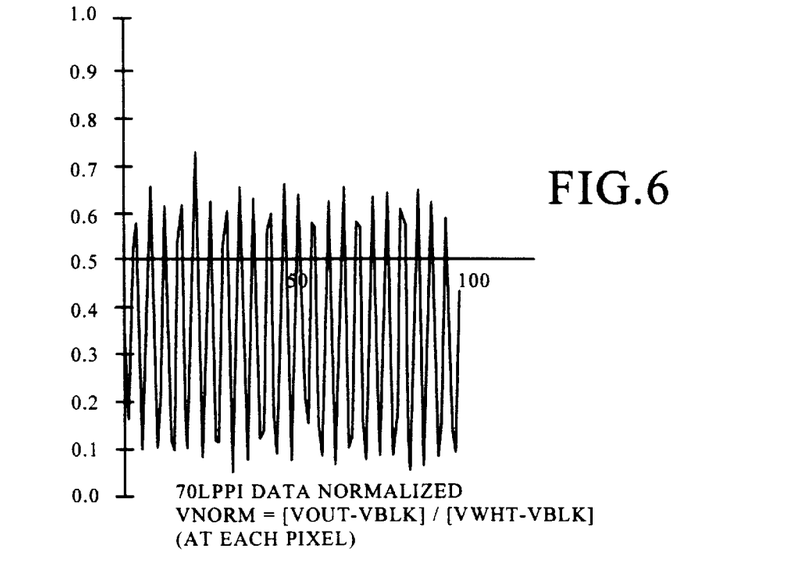
FIG. 6 is a graph depicting a normalization transform of the graph as shown in FIG. 5.

During scanner calibration, the white level intensity and black level from a constant target is set for each pixel/photodiode (it is also known in the art to use charge-coupled device ("CCD") receptors) of the array of the scanner head as a response, $V_{wht}$ or $V_{blk}$, respectively (a photodiode sensor, or CCD element, with no light shining on it should be zero, but in reality leakage current (also known as "dark voltage") causes $V_{blk}$ to be non-zero about its related amplifier DC offset; compensation is thus required to prevent artificial lightness or streaks in dark areas of a scanned original), which can be converted from analog-to-digital counts as would be known in the art. The value of the calibration is demonstrated by scanning a test pattern having a predetermined line pairs per inch ("Ippi") response, e.g. 70 Ippi, presenting a response curve for the scanner head, Vout. These are shown in the graph of FIG. 5. For signal processing, normalization transform is performed as shown in the graph of FIG. 6. Vwht and Vblk become horizontal, by definition at one and zero, respectively. The pixel data then becomes substantially regular as demonstrated in FIG. 6. Thus, a linear adjustment of swath boundary regions provides acceptable error correction.

Figure 4:
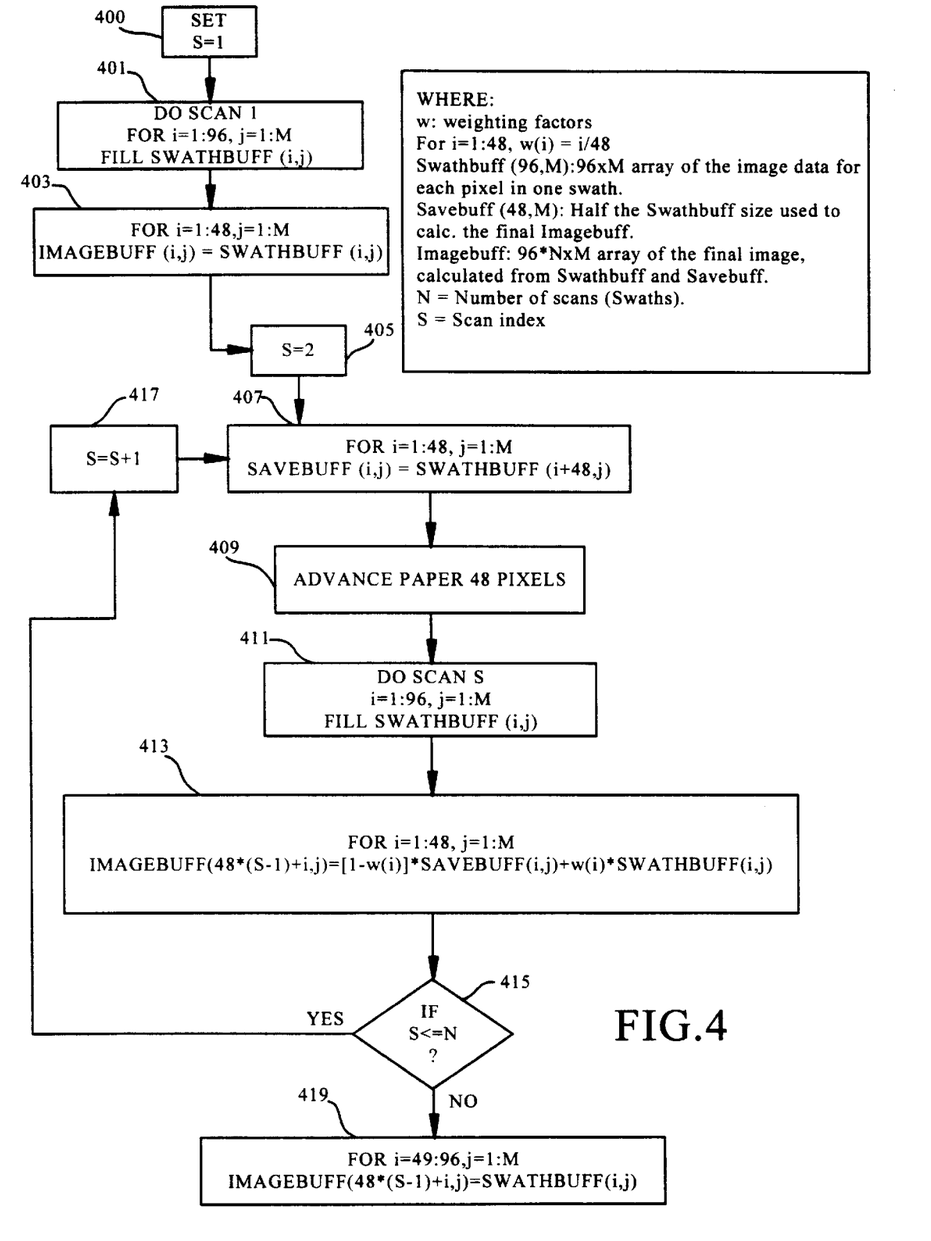
FIG. 4 is a flow chart describing the methodology in accordance with the present invention.

This methodology can be generalized and implemented as a computer program algorithm. A particular embodiment for a half-swath, two-pass overlap scheme is depicted in FIG. 4. The process begins with setting a scan count index to one, step 400. In the next step 401, Pass 1 is performed, "Do Scan 1," for pixel locations "I"=1 through P[i:P, where P=the number of pixels in the scanner head array, e.g., 1–102, generally in a linear array in the y-axis, that is orthogonal to the scan/x-axis) and swath pixel row grid "j"=1 through M[where M=the last pixel in a swath in the scan/x-axis, e.g., for 300 dpi scanning/printing of an 8×10-inch photograph, M=300*8=2400].

Scan 1 is followed by putting the data in a data buffer, "Fill Swath Buff (I, j). In other words, for the first path/first swath, all the pixel intensity data is loaded into a buffer where P=102.

In the next step 403, since only the first pass has occurred, the data for the top half of the swath, I=1:48, will be printed as is without any swath boundary data adjustment at the original leading edge; in other words, there is no transition boundary condition to compensate. Therefore, an imaging buffer from which a video copy or hard copy will be made is loaded with the top half of the swath data captured:

"For I=1:48, j=1:M ImageBuff(i,j)=SwathBuff(I,j)."

The scan index is incremented to 2, step 405: "S=2"[S=1 through "N" where N is the total number of swaths to capture the original.]

Next, step 407, the bottom half of the first swath is saved to another memory buffer:

"For I=1:48, j=1:M Save ImageBuff(i,j)=SwathBuff(I+48, j),"

where it can be used for boundary condition analysis.

Next, a half-swath paper advance (y-axis) is performed: "Advance Paper 48 pixels," step 409.

As in step 401, a scan pass is performed:

"Do Scan S I=1:P, j=1:M Fill SwathBuff(i,j)."

With two scans of data now available, weighting can be applied to the overlapping scan data of Pass 1 (rows 49–96) to the overlapping top half (rows 1–48) of the scan data of Pass 2, step 413:

"For i=1:48, j=1:M ImageBuff(48*(S−1)+i,j)=[1−w(i)]*SaveBuff(i, j)+w(i)*SwathBuff(i,j),"

where w=normalized weighting factor (for this exemplary embodiment w=i/48).
Note again, that it is expressly intended that specific implementation weighting factors can be either a linear averaging progression as previously described, or a data comparison and smoothing technique proprietary to the system designer or known in the state of the art.

Next, if the most recent scan is not the last needed, step 415: "If S≦N," where N=the predetermined number of scans necessary to capture the entire original, the scan index is incremented, step 417: "S=S+1," the result of the previous step saved, step 407, supra, and the process repeats for the next swath.

Once the final swath of data is captured, S=N, since there will be no further boundary discontinuities to be of concern, the last swath bottom half is stored as is, step 419:

"For I=49:96, j=1:M ImageBuff(48*(S−1)+i,j)=SwathBuff(i,j)"

and the data capture is complete. The enhanced captured data set may now be used by a hard copy apparatus, video monitor, or other image rendering apparatus.

A simple white level intensity calibration adjustment can be applied, e.g., if white level varied 10%, apply a decreasing linear progression of 10% to zero depending on the number of pixel rows in the overlap, providing a very simple algorithmic solution. A more computationally intense solution is a pixel-by-pixel comparison between swaths, and application of a predetermined weighting factor (such as the exemplary pixel intensity level difference combination and distance to the boundary as in step 413, FIG. 4).

Figure 7:
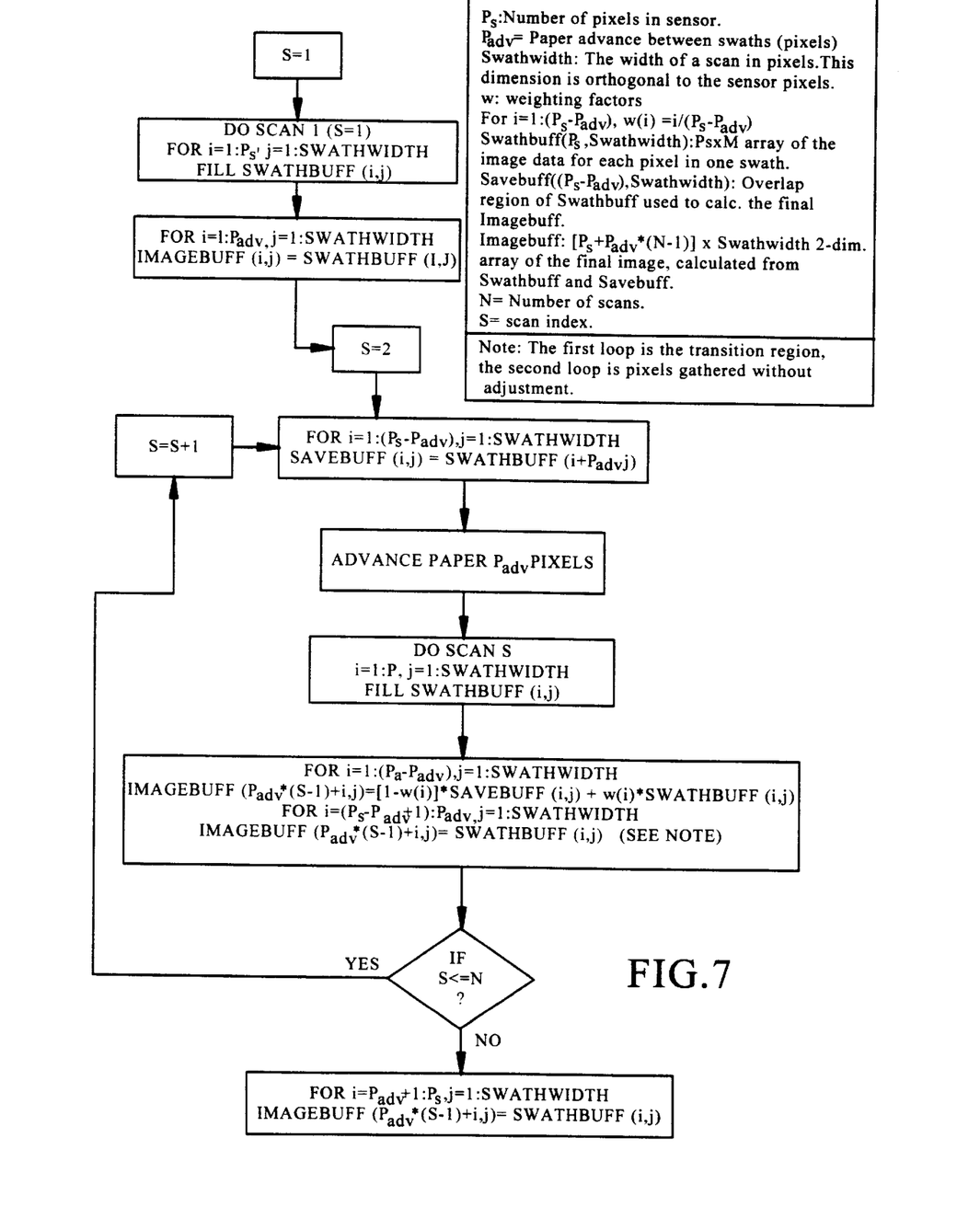
FIG. 7 is a flow chart generalizing an up to two pass methodology in accordance with the present invention as shown in FIG. 4.

FIG. 7 is a generalization of the method of the present invention as shown in FIG. 4 for a pixel weighted transition algorithm for up to two passes. In this sense, the weighting is expressed in generalized terms which are applied such that weighting increases the further the distance from the true swath boundary. Note that this exemplary embodiment is for $P_{adv} > P_S/2$, where $P_{adv}$ is the paper advance between swaths, and where $P_S$ is the number of pixels in the linear sensor array. A similar algorithm exists for $P_{adv} < P_S/2$ three pass ($P_{adv} = P_S/3$), four pass ($P_{adv} = P_S/4$), et seq., although the algorithm gets increasingly more complex and therefore computationally intensive the greater the number of passes. In other words, weighting becomes a factor distance from the true boundary compounded by of the number of overlaps, i.e., passes over the same original, and progresses requiring weighting, e.g., $w_1, w_2, w_3 \ldots w_x$, each of which must be applied to the captured data accordingly. Any specific implementation can therefore optimized for desired scanned image quality results and throughput requirements. Based on the results as shown in a comparison of FIG. 1A to FIG. 1C, for most applications it would appear that a two-pass implementation will suffice.

It is known that photodiodes and the like have a specified signal-to-noise ratio characteristic. In a simplified embodiment of the methodology of the present invention, the signal-to-noise ratio can be improved by applying a special case weighting factor. Instead of a progressive weighting factor that changes mathematically in the swath overlap region with the distance from the true swath boundary, all the weighting factors, $w_i$, are set to average all of the captured data. For example, if the pixel advance for overlap is 48/96, applying a weighting factors of 0.5 provides an averaging of all the captured data (in a three-pass, set $w_i = 0.33$; in N-pass, set $w_i = 1/N$). Statistically, in accordance with the Central Limit Theorem (the distribution of sample means taken from a large population approaches a normal (Gaussian) curve), the result is a reduction in high frequency noise. In other words, by this special case application a smaller standard deviation for the averaged captured data group which will be less than that in the original captured data group. Thus, by use of a computational simple, constant weighting implementation, overlap region data will exhibit improved boundary conditions.

Thus, the algorithm of the present invention matches the overlap data of each scan after the first swath with the data of the previous scan and, depending upon the amount of overlap employed, boundary discontinuities which would result in banding in a hard copy created using non-overlapped, non-compensated data (FIG. 1A) are now reduced and even visually eliminated. Various overlap modes can be employed to make throughput acceptable to the end-user's immediate need.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A method of forming pixel weighted transition regions in multi-pass scanning of an original to ameliorate swath scanner banding at swath boundaries, the method comprising the steps of:

capturing pixel data of a first swath;

capturing pixel data of a second swath such that the second swath includes an overlap swath region with the first swath by a predetermined number of pixels;

comparing pixel data of the overlap swath region captured during the step of capturing pixel data of a first swath with pixel data of the overlap swath region captured during the step of capturing pixel data of a second swath;

determining a weighting factor based upon differences between identical pixel data points obtained during the step of comparing;

applying the weighting factor to pixel data of the overlap swath region captured during the step of capturing pixel data of a first swath; and substituting weighted pixel data from said step of applying for overlap swath region pixel data of said first swath.

2. The method as set forth in claim 1 further comprising the steps of:

repeating each of said steps for each swath having a boundary with a subsequent swath.

3. The method as set forth in claim 1 further comprising the steps of:

the weighting factor is applied to the pixel data captured during the step of capturing pixel data of a first swath as a percentage change of each data point directly proportional to the difference from calibrated white level intensity for a pixel of the overlap region times the distance from the swath boundary divided by the swath width.

4. The method as set forth in claim 3 further comprising:

the percentage is a linearly declining percentage as a function of distance of each row of pixels in the overlap region from the swath boundary decreases.

5. The method as set forth in claim 1 further comprising:

the weighting factor is an adjustment determined as a function of a predetermined profiling equation over a fraction of the swath.

6. The method as set forth in claim 1, the step of determining a weighting factor further comprising the steps of:

comparing a pixel data point in the overlap region captured during the step of capturing pixel data of a first swath with an identical pixel data point captured during the step of capturing pixel data of a second swath;

determining distance between the pixel data point of the overlap region and the swath boundary, and setting the weighting factor as a first proportion of the pixel data point captured during the step of capturing pixel data of a first swath and a second proportion of the pixel data point captured during the step of capturing pixel data of a second swath wherein the first proportion and second proportion are linearly decreasing and increasing, respectively, as the distance of the the identical pixel from the swath boundary decreases.

7. The method as set forth in claim 6, said step of setting the weighting factor further comprising the steps of:

providing three data buffers for scan data; and weighting scan captured data in accordance with the formulae:

$$\text{for } I=1:(P_S-P_{adv}), j=1:\text{SwathWidth}, \text{ImageBuff } (P_{adv}*(S-1)+i,j)= [1-w(i)]*\text{SaveBuff}(i,j)+w(i)*\text{SwathBuff}(i,j), \quad (1)$$

and $$\text{for } I=(P_S-P_{adv}+1): P, j=1:\text{SwathWidth}, \text{ImageBuff } (P_{adv}*(S-1)+i, j)=\text{SwathBuff}(i,j), \quad (2)$$

where the three data buffers are designated ImageBuff, SaveBuff and SwathBuff,

I=swath scanner pixels in a media advance axis, j=swath grid in a scanner scan axis, $P_S$=number of pixels in sensor array, $P_{adv}$=paper advance between swaths in number of pixels, SwathWidth=width of a scan in pixels, S=scan index number, and w=predetermined weighting factors; and where formula (1) is for scan data captured in said overlap region, and formula (2) is for scan data captured without swath boundary data adjustments.

8. A computerized method of improving visual quality of boundary regions of swaths of pixel data of an original captured by a swath scanning apparatus, the method comprising the steps of:

scanning a first swath of the original, the first swath including a plurality of pixel rows, and capturing optical information data indicative of individual pixels of the original during said scanning;

storing captured data representative of each pixel of all pixel rows of the first swath in a first buffer;

storing captured data representative of each pixel of a first predetermined number of pixel rows adjacent the first swath top boundary in a second buffer;

storing captured data representative of each pixel of a second predetermined number of pixel rows adjacent the first swath bottom boundary in a third buffer, where the second predetermined number of pixel rows equals the plurality of pixel rows minus the first predetermined number of pixel rows;

scanning a second swath of the original subjacent the first swath, the second swath having the same number of pixel rows as the first swath and overlapping the pixel rows of the first swath bottom boundary with pixel rows adjacent the second swath top boundary by the second predetermined number of pixel rows, and capturing optical information data indicative of individual pixels of the second swath of the original during said scanning;

storing captured data representative of each pixel of all pixel rows of the second swath in a first buffer;

comparing data representative of each pixel of the second predetermined number of pixel rows adjacent the first swath bottom boundary in the third buffer to the data representative of each same pixel of the overlapping pixel rows of the second swath top boundary, and determining any difference in data representative of each same pixel;

applying a weighting factor to each pixel of the overlapping pixel rows of the first swath bottom boundary based upon a combination of any difference from said step of determining and upon a distance of a pixel to be weighted from the first swath bottom boundary wherein the weighting factor is proportional to the distance; and repeating each step for each successive subjacent swath of the original.

9. The method as set forth in claim 8, the step of applying a weighting factor further comprising the steps of:

determining a maximum white intensity level of any pixel in the first swath second predetermined number of pixel rows;

determining a white intensity level captured for a same said any pixel during said step of scanning a second swath;

determining a difference between said maximum white intensity level and white intensity level for the same said any pixel;

assigning the difference as the weighting factor for the pixel row most distant from the first swath bottom boundary.

10. The method as set forth in claim 9, the step of applying a weighting factor further comprising the step of:

for each successive row toward the first swath bottom boundary, linearly reducing the weighting factor proportionally to a decrease in distance from the first swath bottom boundary.

11. The method as set forth in claim 8, the step of applying a weighting factor further comprising the steps of:

for each pixel having captured data representative of intensity level in overlapping pixel rows of the first swath and pixel rows of the second swath in each of the second predetermined number of pixel rows, determining a difference between the captured data in the first swath and the captured data in the second swath;

in a pixel row distal from the first swath bottom boundary, weighting the data representative of each pixel by 1/(1*the first swath data representative of intensity level for a pixel being weighted);

in a pixel row proximate to the first swath bottom boundary, weighting the data representative of each pixel by 1/(1*the second swath data representative of intensity level for a pixel being weighted), and for each pixel row between said pixel row distal from the first swath bottom boundary and the pixel row proximate the first swath bottom boundary, weighting each pixel data to be a sum of a ratio of (number of pixel rows in the overlapping pixel rows) to (the number of pixel rows between the current pixel row and the pixel row proximate the first swath bottom boundary*(the first swath data representative of intensity level for a pixel being weighted) plus (one–the ratio)*(the second swath data representative of intensity level for a pixel being weighted)).

12. The method as set forth in claim 11 further comprising:

the weighting factor is applied to pixel captured data during the step of capturing pixel data of a first swath as a percentage change of each data point directly proportional to the difference in white level intensity between a current pixel of the overlap region times the distance from the swath boundary divided by the swath width.

13. The method as set forth in claim 11 further comprising:

the weighting factor is a constant for all pixel row distances from the swath bottom boundary and a function of 1/N, where N=number of passes over a swath.

14. A memory having a program for reducing swath scanner swath boundary discontinuities, said program comprising the steps of:

determining a number of scans, N, to scan an entire original;

determining a pixel advance overlap region for swaths of said scans;

scanning swaths of an original image;

capturing data for I=1:P, j=1:M, where I=a pixel number of a range of number of pixel rows in a swath, P, and j=a pixel number of a range of pixels in a row having an array row length of M pixels;

storing captured scan data for I=1:P, j=1:M in an swath buffer (SwathBuff);

for I=1:P and j=1:M, storing captured scan data in an image buffer (ImageBuff);

for the pixel advance overlap regions, storing captured scan data from said swath buffer in a save buffer (SaveBuff);

reforming image buffer data for said overlap regions by weighting captured data in accordance with a predetermined formulae such that a pixel weighted transition zone replaces captured data for the pixel advance overlap regions for each swath having a boundary with a preceding swath.

15. The memory program as set forth in claim 14, said step of reforming said image buffer data further comprising:

weighting scan captured data in accordance with the formulae:

for I=1:($P_S-P_{adv}$), j=1:SwathWidth, ImageBuff ($P_{adv}$*(S-1)+i,j)= [1-w(i)]*SaveBuff(i,j)+w(i)*SwathBuff(i,j), (1)

and for I=($P_S-P_{adv}$+1):$P_{adv}$, j=1:SwathWidth, ImageBuff (P,*(S-1)+i, j)=SwathBuff(i,j); (2)

where

I=swath scanner pixels in a media advance axis, j=swath grid in a scanner scan axis, $P_S$=number of pixels in sensor array, $P_{adv}$=paper advance between swaths in number of pixels, SwathWidth=width of a scan in pixels, S=scan index number, and w=predetermined weighting factors; and where formula (1) is for scan data captured in said overlap region, and formula (2) is for scan data captured without swath boundary data adjustments.

16. The memory program as set forth in claim 14, said step of reforming image buffer data further comprising:

reducing scanner noise-to-signal ratio by setting said weighting factor to implement the Central Limit Theorem on the captured scan data in said overlap region.

17. The memory program as set forth in claim 16, said step of reforming image buffer data further comprising:

setting said weighting factor at 1/N, where N=number of passes over a swath.

18. The memory program as set forth in claim 14, further comprising:

$P_S = P_{adv}/2;$ said weighting factor is a linear function changing proportionally to increase as distance from said swath boundary decreases as determined with respect to number of pixels comprising $P_{adv}$.

* * * * *